United States Patent Office 3,221,489
Patented Dec. 7, 1965

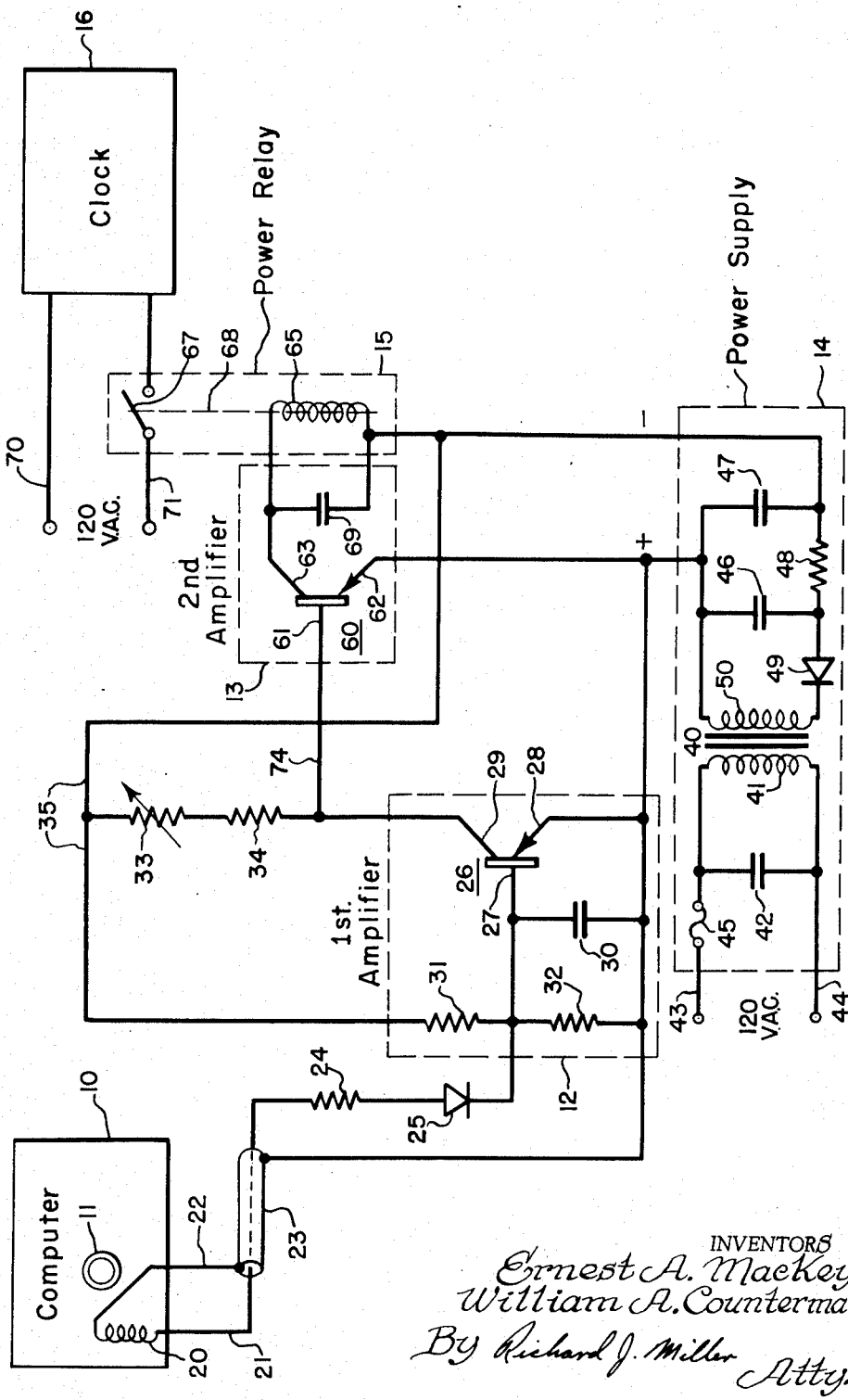

3,221,489
ELECTRONIC DIGITAL COMPUTER ELAPSED PROCESSING TIME METER
Ernest A. Mackey and William A. Counterman, Roosevelt, N.J., assignors, by mesne assignments, to the United States of America as represented by the Secretary of the Navy
Filed Aug. 29, 1963, Ser. No. 305,567
3 Claims. (Cl. 58—145)

This invention relates to an operating condition meter and more specifically to an electronic digital computer elapse processing time meter.

In commercial usage computers are generally billed on the basis of time utilized to perform actual computing operations. Because of the high initial expense it is necessary to maintain reasonably accurate records of actual computer use. In addition, maintenance and repair work requires knowledge of total usage both in performing routine and periodic overhauls.

It is an object of this invention to provide an improved electronic function meter for determing the actual time of operation of a device.

It is a further object of this invention to provide an improved electronic digital computer elapse processing time meter for maintaining a record of time utilized by a computer in performing computations.

It is yet a further object of this invention to provide an operation condition meter, for indicating one of several operating conditions of a device, comprising: means for detecting a radiated electrical signal emanating from said device, the signal caused by a change in operating conditions in the device; means, for rectifying and amplifying said detected signal, coupled to the detecting means; switching means actuated by the rectifying and amplifying means when a radiated signal is detected; and means, actuated by the switching means, for indicating the presence and detection of a radiated signal.

Further objects and advantages of the invention will be apparent from the accompanying specification and claims wherein:

The figure is a schematic drawing of one embodiment of the invention.

In the figure there is schematically represented a computer 10 with a memory unit 11. Although the embodiment of the invention discussed is in an environment including a computer it is understood that other devices which generate a electrical signal in conjunction with a condition of operation thereof, could equally well utilize the time recording meter. In general, there is further shown a first amplifier 12, a second amplifier 13, a power supply 14, a power relay 15 and a recording clock device 16. A "loop stick" pick-up device 20 shown adjacent the memory device 11 is positioned to intercept radiated electrical signals when the memory unit is in operation. A pair of leads 21, 22 couple the pick-up device through a shielded cable 23 to first amplifier 12 through a resistor 24 and a diode 25. An amplifier 12 includes a transistor 26 having base, emitter and collector electrodes 27, 28 and 29, a capacitor 30 connected to base and emitter electrodes 27, 28 of transistor 26 and a pair of biasing resistors 31, 32. A potentiometer 33 and a resistor 34 connected in series to the collector electrode 29 complete the biasing circuit for the transistor 26 and are joined through a lead 35 to the negative terminal of power supply 14.

Power supply 14 is of standard construction including a power transformer 40 having a primary winding 41 across which is coupled a capacitor 42. A pair of leads 43, 44 connects winding 41 to a source of alternating current (not shown) and includes a fuse 45. A pair of capacitors 46, 47 and a load resistor 48, a diode 49 and the secondary winding 50 of transformer 40 provides the usual positive and negative voltage as shown.

Second amplifier 13 includes a power transistor 60 having base, emitter and collector electrodes 61, 62 and 63. A coil 65 of power relay 15 is connected between collector electrode 63 and the negative terminal of the power supply and actuates a switch 67 by a linkage schematically represented by the dashed line 68. A capacitor 69 is coupled across coil 65. Clock 16 is connected through a pair of wires 70, 71 to a source of alternating current which serves to turn the clock on when switch 67 is closed.

In operation prior to the actuation of the computer the coil 65 is not energized, switch 67 is open and transistor 60 is not conducting. Emitter 62 is substantially the voltage of the positive terminal of the power supply while collector electrode 63 is at the negative potential. Current flow through resistors 31, 32 establish base electrode 27 of transistor 26 at a potential less positive than the positive terminal of the power supply. Thus, transistor 26 is conducting and collector electrode 29 which is joined to base electrode 61 of transistor 60 are at substantially the same potential and transistor 60 is maintained in a nonconductive state.

When the computer 10 is performing the computation operation an electrical signal is radiated from memory unit 11 which in turn is picked up by device 20 and rectified by the diode 25. The voltage on base electrode 27 is changed and transistor 26 is effectively nonconductive. In consequent thereof collector electrode 29 and base electrode 61 have a voltage applied thereto which is substantially that of the negative terminal of the power supply and transistor 60 is rendered conductive. Current flow of sufficient magnitude is produced through the coil 65 to cause linkage 68 to move at a downward direction and switch 67 is closed, thus, the clock is activated to record computing time.

Although, PNP transistors have been shown it is obvious to one skilled in the art that NPN devices may be substituted therefor with proper attention being given to the biasing conditions to provide an operative circuit.

In one successful embodiment of the invention the following sizes of components were utilized:

Resistors

| | | |
|---|---|---|
| R24 | ohm | 1K |
| R31 | do | 220K |
| R32 | do | 470K |
| R33 | do | 10K |
| R34 | do | 4.7K |
| R48 | do | 1.8K |

Capacitors

| | | |
|---|---|---|
| C30 | μμf | 500 |
| C42 | μf | .0047 |
| C46 | μf | 10 |
| C47 | μf | 10 |
| C69 | μf | 1 |

Transistors

| | |
|---|---|
| 26 and 60 | CDC 101 |

Diodes

| | |
|---|---|
| 25 | Hughes, HD 2969. |
| 14 | In 2486, Sarkes Tarzian. |
| 15 | Relay Potter Brunfield SS5D. |

We claim:
1. An elapsed time indicating meter for use in conjunction with a computer having a magnetic memory unit, comprising:
   (a) an antenna positioned adjacent to said unit for receiving electromagnetic signals emanating from said unit;

(b) circuit means, including a resistance-capacitance network having a predetermined time constant for rectifying received signals;
(c) shielded coupling means connecting said antenna to said circuit means, said coupling means isolating said circuit means from actuation by random signals from source other than said computer;
(d) a first amplifier coupled to said circuit means for amplifying said rectified signals;
(e) a power amplifier having an output circuit coupled to said first amplifier for amplifying signals from said first amplifier;
(f) a power relay, having a coil serially connected to said output circuit, activated when said power amplifier receives signals;
(g) a switch having an open and a closed position activated to said closed position when said relay is activated; and
(h) a clock device, activated by said switch in said closed position, for measuring time that said computer is in operation.

2. An elapsed time indicating meter for use in conjunction with a computer having a magnetic memory unit, comprising:
(a) an antenna positioned adjacent to said unit for receiving electromagnetic signals emanating from said unit when said computer is performing the computation function and said memory unit is activated;
(b) circuit means, including a resistance-capacitance network having a predetermined time constant for rectifying received signals;
(c) shielded coupling means connecting said antenna to said circuit means said means isolating said circuit means from actuation by random electromagnetic signals from source other than said memory unit of said computer;
(d) a first transistor amplifier circuit coupled to said circuit means for amplifying said rectified signals;
(e) a transistor power amplifier having an output circuit coupled to said first amplifier circuit for amplifying signals from said first amplifier circuit;
(f) a power relay, having a coil serially connected to said output circuit, said relay activated when said power amplifier receives signals;
(g) a switch having an open and a closed position activated to said closed position when said relay is activated; and
(h) a clock device, activated by said switch in said closed position, for measuring time that said computer is in operation.

3. An elapsed time indicating meter for use in conjunction with a computer having a magnetic memory unit, comprising:
(a) an antenna positioned adjacent to said unit for receiving electromagnetic signals emanating from said unit when said computer is performing the computation function and said memory unit is activated;
(b) a series rectifying circuit including a resistor and diode;
(c) shielded coupling means connecting said antenna to said series rectifying circuit means, said coupling means isolating said series circuit means from actuation by random electromagnetic signals from sources other than said memory unit of said computer;
(d) circuit means, including a resistance-capacitance network having a predetermined time constant connected to said series circuit;
(e) a first transistor amplifier circuit coupled to said network for amplifying said rectified signals;
(f) a transistor power amplifier having an output circuit coupled to said first amplifier circuit for amplifying signals from said first amplifier circuit;
(g) a power relay, having a coil serially connected to said output circuit; said relay activated when said power amplifier receives signals;
(h) a switch having an open and a closed position activated to said closed position when said relay is activated; and
(i) a clock device, activated by said switch in said closed position, for measuring time that said computer is in operation.

References Cited by the Examiner
UNITED STATES PATENTS

| | | | |
|---|---|---|---|
| 1,981,860 | 11/1934 | Gebhard et al. | 58—145 |
| 3,001,114 | 9/1961 | Hermann et al. | 318—16 |
| 3,131,314 | 4/1964 | Charlot | 307—88.5 |

FOREIGN PATENTS

| | | |
|---|---|---|
| 211,217 | 6/1956 | Australia. |

LEO SMILOW, *Primary Examiner.*